(12) United States Patent
Pampus et al.

(10) Patent No.: US 12,228,688 B2
(45) Date of Patent: Feb. 18, 2025

(54) METHOD AND A DEVICE FOR CLASSIFYING AN OBJECT, IN PARTICULAR IN THE SURROUNDINGS OF A MOTOR VEHICLE

(71) Applicant: Robert Bosch GmbH, Stuttgart (DE)

(72) Inventors: Christian Pampus, Leonberg (DE); Michael Schumann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 62 days.

(21) Appl. No.: 17/764,672

(22) PCT Filed: Aug. 11, 2020

(86) PCT No.: PCT/EP2020/072518
§ 371 (c)(1),
(2) Date: Mar. 29, 2022

(87) PCT Pub. No.: WO2021/069130
PCT Pub. Date: Apr. 15, 2021

(65) Prior Publication Data
US 2022/0342061 A1    Oct. 27, 2022

(30) Foreign Application Priority Data

Oct. 8, 2019    (DE) .................... 10 2019 215 393.3

(51) Int. Cl.
*G01S 7/53*    (2006.01)
*G01S 7/527*    (2006.01)
(Continued)

(52) U.S. Cl.
CPC ................ *G01S 7/53* (2013.01); *G01S 7/527* (2013.01); *G01S 7/539* (2013.01); *G01S 15/42* (2013.01);
(Continued)

(58) Field of Classification Search
CPC .......... G01S 15/46; G01S 15/10; G01S 15/42; G01S 15/87; G01S 7/527; G01S 15/931;
(Continued)

(56) References Cited

U.S. PATENT DOCUMENTS 6,178,141 B1 * 1/2001 Duckworth ........... G01S 3/8083
367/906
6,268,803 B1 * 7/2001 Gunderson ............ G08G 1/166
340/436

(Continued)

FOREIGN PATENT DOCUMENTS

CN    104136935 A    11/2014
CN    105683777 A    6/2016
(Continued)

OTHER PUBLICATIONS

International Search Report for PCT/EP2020/072518, Issued Nov. 11, 2020.

*Primary Examiner* — Daniel L Murphy
*Assistant Examiner* — Amie M Ndure
(74) *Attorney, Agent, or Firm* — NORTON ROSE FULBRIGHT US LLP; Gerard A. Messina

(57) ABSTRACT

A method is provided for classifying an object, in particular in the surroundings of a motor vehicle, using an ultrasonic sensor system, the ultrasonic sensor system including a plurality of spatially distributed ultrasonic sensors. A plurality of measurements are carried out continuously during a measurement, an ultrasonic signal being emitted by one of the ultrasonic sensors, a signal being received by at least one of the ultrasonic sensors which includes a plurality of reflected echo signals, so-called multiple echoes, and the received echo signals being associated with an object. A plurality of features may be determined from the received echo signals. The object is classified as a function of a (Continued)

combination of at least two of these features, in particular as a pedestrian.

11 Claims, 2 Drawing Sheets

(51) Int. Cl.
 G01S 7/539 (2006.01)
 G01S 15/42 (2006.01)
 G01S 15/93 (2020.01)
 G01S 15/931 (2020.01)
(52) U.S. Cl.
 CPC ....... G01S 15/931 (2013.01); *G01S 2015/932* (2013.01); *G01S 2015/938* (2013.01)
(58) Field of Classification Search
 CPC . G01S 7/539; G01S 7/53; G01S 15/52; G01S 7/54; G01S 2015/465; G01S 2015/938; G01S 2015/932
 USPC .......................................................... 367/99
 See application file for complete search history.

(56) References Cited

U.S. PATENT DOCUMENTS

| | | | | |
|---|---|---|---|---|
| 6,384,718 | B1* | 5/2002 | Nass ................. | G01S 15/04 340/436 |
| 6,615,138 | B1* | 9/2003 | Schiffmann ........... | G01S 13/931 340/917 |
| 8,310,376 | B2* | 11/2012 | Frank .................... | G01S 15/931 340/436 |
| 8,384,531 | B2* | 2/2013 | Szczerba ............. | G01S 13/867 340/435 |
| 8,428,305 | B2* | 4/2013 | Zhang .................... | G08G 1/165 382/254 |
| 2004/0140927 | A1* | 7/2004 | Meinecke .......... | H04N 21/4782 348/E7.083 |
| 2007/0182587 | A1* | 8/2007 | Danz ..................... | G01S 15/931 340/903 |
| 2009/0213694 | A1* | 8/2009 | Zott ..................... | B60R 21/0134 367/95 |
| 2010/0302069 | A1* | 12/2010 | Frank .................... | G01S 15/931 340/932.2 |
| 2011/0121994 | A1* | 5/2011 | Pampus ................. | G01S 15/931 340/932.2 |
| 2014/0029385 | A1* | 1/2014 | Schumann ........... | G01S 15/931 367/99 |
| 2017/0299717 | A1* | 10/2017 | Hallek ....... | G01S 7/539 |
| 2019/0197497 | A1* | 6/2019 | Abari ................... | G05D 1/0088 |
| 2019/0369238 | A1* | 12/2019 | Klotz ......... | G01S 7/53 |
| 2021/0064030 | A1* | 3/2021 | Jiang ................ | G08G 1/096877 |
| 2021/0124350 | A1* | 4/2021 | Kirigan ................ | G06V 10/762 |
| 2021/0124355 | A1* | 4/2021 | Kirigan ................ | G05D 1/0214 |
| 2021/0197834 | A1* | 7/2021 | Shaker ................. | G01S 7/354 |
| 2022/0244379 | A1* | 8/2022 | Wang ................... | B60W 40/04 |

FOREIGN PATENT DOCUMENTS

| | | | | |
|---|---|---|---|---|
| CN | 109493633 A | 3/2019 | | |
| CN | 109870697 A | 6/2019 | | |
| DE | 10344299 A1 | 4/2005 | | |
| DE | 102005021225 A1 * | 11/2006 | ......... | B60R 21/0134 |
| DE | 102007061235 A1 | 6/2009 | | |
| DE | 102016113736 A1 | 2/2018 | | |
| DE | 112016003462 T5 | 5/2018 | | |
| DE | 102016124157 A1 | 6/2018 | | |
| DE | 102018103551 A1 | 8/2019 | | |
| EP | 2908153 A2 | 8/2015 | | |
| JP | 2012229948 A | 11/2012 | | |
| JP | 2012247215 A | 12/2012 | | |
| JP | 2013541696 A | 11/2013 | | |
| JP | 2016180654 A | 10/2016 | | |
| JP | 2017151043 A | 8/2017 | | |
| WO | 2015090849 A1 | 6/2015 | | |
| WO | WO-2018210966 A1 * | 11/2018 | ........... | G01S 13/862 |

* cited by examiner

METHOD AND A DEVICE FOR CLASSIFYING AN OBJECT, IN PARTICULAR IN THE SURROUNDINGS OF A MOTOR VEHICLE

FIELD

The present invention relates to a method and a device for classifying an object, in particular in the surroundings of a motor vehicle, with the aid of an ultrasonic sensor system, the ultrasonic sensor system including a plurality of spatially distributed ultrasonic sensors.

BACKGROUND INFORMATION

A device for recognizing a dynamic object in the surroundings of a motor vehicle with the aid of ultrasound is described in European Patent Application No. EP2908153 A2, which includes a sensor array including at least two sensor elements situated at a predefined distance from one another, which acts both as sender and also as receiver. A detected moving object is classified based on its trajectory and the velocity by comparison to predefined models, for example, as a pedestrian.

A vehicle control device is described in German Patent Application No. DE 112016003462 T5, which includes an ultrasonic sensor designed to detect an obstacle ahead of the vehicle and a monocular camera designed to record an image of an area ahead of the vehicle. A control unit ascertains the presence or absence of an obstacle ahead of the vehicle based on images which are recorded using the monocular camera during the trip of the vehicle and regulates the drive force of the vehicle according to a combination of detection or non-detection of an object by the ultrasonic sensor and the presence or the absence of an obstacle, which is ascertained based on the image recorded using the monocular camera.

German Patent Application No. DE 102016124157 A1 shows a method for ascertaining a necessity for braking for a motor vehicle as a function of a possible collision object, for example a pedestrian, in a surrounding area of the motor vehicle.

An object of the present invention may be considered to be the implementation of a preferably reliable pedestrian recognition in the surroundings of a motor vehicle based on an ultrasonic sensor system.

SUMMARY

The object may be achieved by the method and the device according to the present invention. Preferred example embodiments of the present invention are disclosed herein.

A method is provided for classifying an object, in particular in the surroundings of a motor vehicle, with the aid of an ultrasonic sensor system, the ultrasonic sensor system including a plurality of spatially distributed ultrasonic sensors.

The ultrasonic sensor system may be, for example, part of a driving assistance system or parking assistance system provided at a motor vehicle. The ultrasonic sensors may be situated, for example, distributed on a front and/or rear bumper of the motor vehicle.

In accordance with an example embodiment of the present invention, each of the ultrasonic sensors may be designed to emit ultrasonic signals and receive ultrasonic signals reflected at an object. The distance to the object may be determined in a conventional way with the aid of the propagation time of a received ultrasonic signal reflected at an object. Extended and structured objects may generate so-called multiple echoes. In this case, the emitted ultrasonic signal is reflected at various points of the object and multiple echo signals each having different propagation times may be received by an ultrasonic sensor from one sent ultrasonic signal.

In accordance with an example embodiment of the present invention, the method includes the following steps:

A plurality of measurements are carried out, in particular continuously, during each measurement an ultrasonic signal being emitted by one of the ultrasonic sensors, a signal being received by at least one of the ultrasonic sensors, which includes a plurality of reflected echo signals, so-called multiple echoes, and the received echo signals being associated with an object.

A plurality of features may be determined from the received echo signals:
- a first feature which represents a frequency with respect to the number of measurements carried out, with which a distance d exceeds a predefined distance threshold value, distance d corresponding to a distance between a temporally first received echo signal and a temporally last received echo signal of a measurement including multiple echoes;
- a second feature, which represents a variance of distance d;
- a third feature, which represents a distribution of the number of the received echo signals per measurement via the ultrasonic sensors;
- a fourth feature, which represents the alignment of the ultrasonic sensors with respect to the object;
- a fifth feature, which represents a variance of first object distances over multiple measurements, an associated first object distance being calculated for each determined temporally first received echo signal, in particular an approach of the object being taken into consideration in the determination of the variance;
- a sixth feature, which represents a correlation of a received echo signal with the sent ultrasonic signal;
- a seventh feature, which represents an amplitude of an echo signal;
- an eighth feature, which represents a distribution of reflection points, each reflection point indicating a measured object position.

All mentioned features enable a classification of the object and in particular a separation of pedestrians and curbstones or other objects, which are not relevant, for example, for an automated or assisted emergency braking function of a motor vehicle, with a certain probability. No single feature is, taken alone, unambiguous enough to enable a reliable statement without the addition of further features as to whether the object is a pedestrian or not. Therefore, according to the present invention, the mentioned features are logically or statistically combined with one another.

According to an example embodiment of the present invention, the object is classified as a function of a combination of at least two of these features, in particular as a pedestrian. A combination is understood here to mean that features are evaluated as to whether, for example, certain threshold values are exceeded or not reached, or certain distributions or variances of distributions of the features are observed in a plurality of, for example, successive measurements. Each observed feature may supply a certain contribution for establishing the classification, for example, in that it indicates a probability that the object is a pedestrian.

Alternatively or additionally, the features may be used for machine learning as input signals of a so-called classifier (for example a neural network, a decision tree, etc.), which is trained via a database.

In particular the first and the third feature may be combined as follows for a reliable classification of the object as a pedestrian: When the frequency according to the first feature, at which a distance d between the temporally first detected echo signal and the temporally last detected echo signal of a multiple echo exceeds a predefined distance threshold value, is particularly high, thus exceeds a frequency threshold value, and the distribution according to the third feature has the result that only certain ones of the ultrasonic sensors, in particular only one of the ultrasonic sensors or only a few of the ultrasonic sensors, which are in particular situated adjacent to one another, have received a plurality of echo signals per measurement, the object is thus classified as a pedestrian.

The present invention is based on the finding that a pedestrian, as a structured object, reflects ultrasound at various points, for example, at the foot, at the torso, the head, and/or the arms. Due to this characteristic, multiple echo signals (reflections, multiple echoes) are typically obtained with a single ultrasonic measurement, which are in succession over time or distance. It is characteristic that distance d between the temporally first received signal and the temporally last received signal is often relatively large, in particular greater than in the case of low objects, for example, curbstones. This may be due to the fact, for example, that various body parts, which have a large distance to one another seen from the ultrasonic sensor, reflect the sent ultrasonic signal In addition, this relative distance d may vary strongly due to the movement of the pedestrian, in particular if one observes a sequence of successive measurements. This effect is additionally due to the fact that the same points of the pedestrian do not reflect the sent ultrasonic signal in each measurement.

It is accordingly used as a first feature for classifying the reflected object how frequently, in relation to the total number of measurements which are associated with the object, multiple echoes are measured and how frequently distance d is large, thus greater than a certain threshold value (first feature).

In addition, it may be determined as a second feature for the classification how greatly distance d varies, thus how large the variance of d is.

Certain curbstone structures, for example, curbstones having grass pavers located behind them, may generate similar echo signals, in particular multiple echoes, as a pedestrian. However, a pedestrian has an accumulation of the received multiple echoes only in the case of those ultrasonic sensors, whose main measurement axis is aligned essentially in the direction toward the pedestrian or whose main measurement axis has the smallest possible angle in relation to the pedestrian. In ultrasonic sensors whose main measurement axis has a larger angle to the pedestrian, the echo signals reflected multiple times are often indistinct due to the signal propagation paths, so that multiple reflections are not received or are only received to a minor extent. In the case of pedestrians, a cumulative occurrence of the typical multiple echoes may thus in particular only be established at only one of the ultrasonic sensors or at two adjacent ultrasonic sensors, whereas such a distribution is not to be observed, for example, in the case of a curbstone as the reflecting object. Therefore, a distribution of the number of the received echo signals per measurement via the ultrasonic sensors is detected as the third feature. It is thus detected which of the ultrasonic sensors receive a plurality of echo signals per measurement and which do not. A reflecting object is preferably classified as a pedestrian if the distribution according to the third feature has the result that only certain ones of the ultrasonic sensors, in particular only one of the ultrasonic sensors or only a few of the ultrasonic sensors, which are in particular situated adjacent to one another, have received a plurality of echo signals per measurement, which have contributed to the object to be classified. It is taken into consideration here in particular that in complex scenes the other ultrasonic sensors may also detect echo signals, but not echo signals which are assigned to the object to be classified due to their position in space, which may be determined, for example, by trilateration.

According to the fourth feature, the alignment of the ultrasonic sensors with respect to the object may be determined. It may thus additionally be taken into consideration that the multiple echo signals are often very indistinct and may only be recognized at all by very sensitively set sensor systems. The reception of these ultrasonic signals (multiple echoes) may therefore vary greatly between the various ultrasonic sensors. It is therefore optionally provided, to form the statistics, i.e., thus in particular to determine distance d, to determine the frequency at which distance d exceeds a certain threshold value according to the first feature, and/or to determine the variance of d according to the second feature, in particular only to evaluate the measurement data of those ultrasonic sensors which are aligned on the object, thus have a good view angle or preferably only to use that ultrasonic sensor which has the best view angle to the object in the comparison. For this purpose, in particular the angle of the main axis of each ultrasonic sensor in relation to the recognized object may be taken into consideration.

Also due to the complex structure of a pedestrian, in a sequence of measurements, the object distance which results from the temporally first received reflected echo signal (first reflection) also varies greatly, in particular in comparison to a geometrically simple, stable reflector such as a curbstone. The variance of the object distance which results from the temporally first received reflected echo signal (first reflection) may thus be used as a further, fifth feature. In particular if this variance exceeds a second variance threshold value, the object may be classified as a pedestrian.

Since multiple points always reflect in the case of the pedestrian, the echo signals are acoustically superimposed. If an ultrasonic sensor emits coded ultrasonic signals, for example, by using a characteristic frequency profile, and if the receiving ultrasonic sensor evaluates the profile of the received echo signal to ascertain a correlation, the superposition of the echo signals results in an interfering influence on the correlation, i.e., the correlation decreases. In the case of a curbstone, for example, in contrast very high correlations may be observed, which may never occur in this way in the case of a pedestrian. Therefore, the correlation of the received echo signal with the sent ultrasonic signal is determined as a sixth feature. If very high correlation values are received, this may be used as an exclusion criterion for a classification as a pedestrian. A classification of the object as a pedestrian is preferably excluded if the correlation value is greater than a certain correlation threshold value for a certain number of measurements.

According to the seventh feature, an amplitude of at least one received echo signal may be evaluated. Since the clothing of a pedestrian typically strongly absorbs acoustic signals, the reflected sound energy of an ultrasonic signal reflected from a pedestrian is rather slightly to moderately pronounced. In particular, the amplitude may be evaluated in such a way that particularly high amplitudes reduce the probability of classification as a pedestrian. In particular, the classification of an object as a pedestrian may be excluded if the amplitude of at least one received ultrasonic signal is greater than a certain amplitude threshold value.

In each measurement, a so-called reflection point may furthermore be determined, which indicates a position in space from which the received ultrasonic signal was reflected. A reflection point may typically be determined in a conventional way by trilateration.

It is furthermore typical of a pedestrian that the reflection points received from one measurement to the next jump intensely on-site, i.e., the coordinates which may be associated with the pedestrian as an object in space in the case of one measurement vary in a certain way. This results from the complex geometric structure of the pedestrian and from the fact that the pedestrian may move. The spatial distribution of the reflection points, which represent an on-site association of multiple measurements via trilateration, in a sequence of measurements as a further, eighth feature may thus be used. In particular, if the spatial distribution of the reflection points according to the eighth feature has a characteristic shape, in particular an accumulation of reflection points at a probable object position and a scattering in the lateral direction, the object may be classified as a pedestrian.

All mentioned features enable a separation of pedestrians and curbstones or other, not braking-relevant objects, with a certain probability. No single feature, taken alone, is unambiguous enough to enable a reliable statement without adding further features. Therefore, according to the present invention, the mentioned features are in particular logically or statistically combined with one another. The features may also be used for machine learning as input signals of a classifier (neural network, decision tree, . . . ), which is trained via a database. The type of the logical combination is not primarily decisive, rather the features are decisive for recognizing a pedestrian.

It is furthermore to be noted that not all features have to be used to enable a classification, rather an improvement of the classification quality may be achieved via the combination of the features.

The more the described features are combined in the classification of the object, the greater is the reliability of recognizing an actual pedestrian as such and achieving a low incorrect recognition rate, i.e., an incorrect recognition of an object which is not a pedestrian (for example a curbstone) as a pedestrian (false positive).

According to a further aspect of the present invention, a device is provided which is designed for classifying an object, in particular in the surroundings of a motor vehicle. In accordance with an example embodiment, the method includes:

- an ultrasonic sensor system, the ultrasonic sensor system including a plurality of spatially distributed ultrasonic sensors, in particular situated at a body of a motor vehicle,
- an evaluation unit, which is designed to carry out the steps according to a method designed as described above.

In particular, the evaluation unit is designed to determine two or more of the above-described features from the measurement data detected by the ultrasonic sensors and to combine at least two of the features to determine a classification of an object in the surroundings of the device.

The device may be part of a driver assistance system of a motor vehicle. The ultrasonic sensors are preferably situated at a bumper of the motor vehicle and aligned in such a way that they may detect an area in the travel direction ahead of or behind the motor vehicle.

The device may in particular be part of a braking assistance system, for example, emergency braking being able to be triggered if an object is classified as a pedestrian and the object is detected, for example, in the travel direction of the motor vehicle at a distance closer than a certain minimum distance.

According to a further aspect of the present invention, a motor vehicle is provided which includes a device according to the present invention.

BRIEF DESCRIPTION OF THE DRAWINGS

Specific embodiments of the present invention are described in detail with reference to the figures.

DETAILED DESCRIPTION OF EXAMPLE EMBODIMENTS

Figure 1:
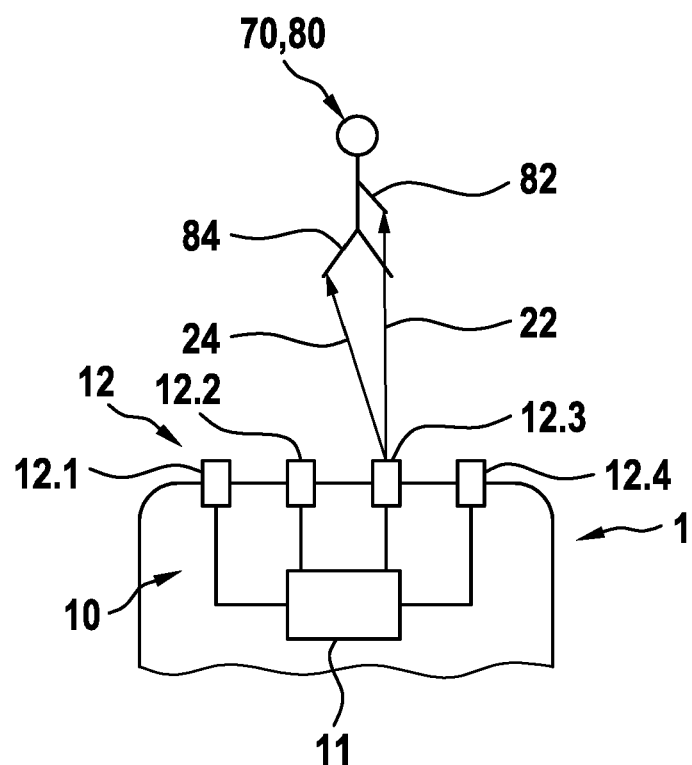
FIG. 1 shows a device according to one possible exemplary embodiment of the present invention upon the detection of a pedestrian.

In the following description of the exemplary embodiments of the present invention, identical elements are identified by identical reference numerals, a repeated description of these elements possibly being omitted. The figures only schematically show the subject matter of the present invention.

The front part of a motor vehicle 1 is schematically shown in FIG. 1. Motor vehicle 1 includes a device 10 for classifying an object 70 in the surroundings of motor vehicle 1. Device 10 includes an ultrasonic sensor system, the ultrasonic sensor system including four ultrasonic sensors 12.1, 12.2, 12.3, and 12.4 situated along the front of motor vehicle 1. Device 10 additionally includes an evaluation unit 11, which is designed to evaluate the measurement data of ultrasonic sensors 12.1 through 12.4 and to classify object 70 based thereon. The evaluation unit is designed to activate each of ultrasonic sensors 12.1 through 12.4 so that ultrasonic sensors 12.1 through 12.4 send ultrasonic signals and to receive ultrasonic signals reflected at object 70 and associate the received signals with object 70.

In the illustrated example, object 70 is a pedestrian 80.

To classify object 70 as a pedestrian 80, various features of the received echo signals are determined.

Due to the characteristic structure and shape of a pedestrian 80, the probability is high that at least one of ultrasonic sensors 12.1 through 12.4 will receive a signal which includes a plurality of reflected echo signals. Thus, for example, a hand 82 and a foot 84 of pedestrian 80 reflect the sent ultrasonic signal of ultrasonic sensor 12.3. For example, foot 84 may have a lesser distance 24 to ultrasonic sensor 12.3 than distance 22 of hand 82. Ultrasonic sensor 12.3 will thus receive at least two echo signals in one measurement. Assuming foot 84 has the least distance to ultrasonic sensor 12.3 of all reflecting points of pedestrian 80 and hand 82 has the greatest distance to ultrasonic sensor 12.3 of all reflecting points of pedestrian 80, the echo signal which was reflected from foot 84 is thus received as the temporally first echo signal and the echo signal which was reflected from hand 82 is received as the temporally last echo signal.

A distance d between the temporally first received echo signal and the temporally last received echo signal may be determined from the echo signals. For this purpose, for example, initially a propagation time difference of these echo signals is determined, from which a spatial distance d may be calculated in a conventional way if the speed of sound of the ultrasonic signals is known. It may be observed over a plurality of measurements how particular determined distance d behaves. For example, if a distance d is determined in a certain minimum portion of the measurements, which exceeds a certain threshold value, this fact may thus be used as an indicator that object 70 is a pedestrian. In addition, great variations of distance d are caused by movement, for example, of the arms and legs, and/or different alignment of a pedestrian 80 in relation to the ultrasonic sensors. If a variance of distance d is thus observed, for example, if this variance exceeds a certain threshold value, this may thus be used as a further indicator that object 70 is a pedestrian.

Figure 3:
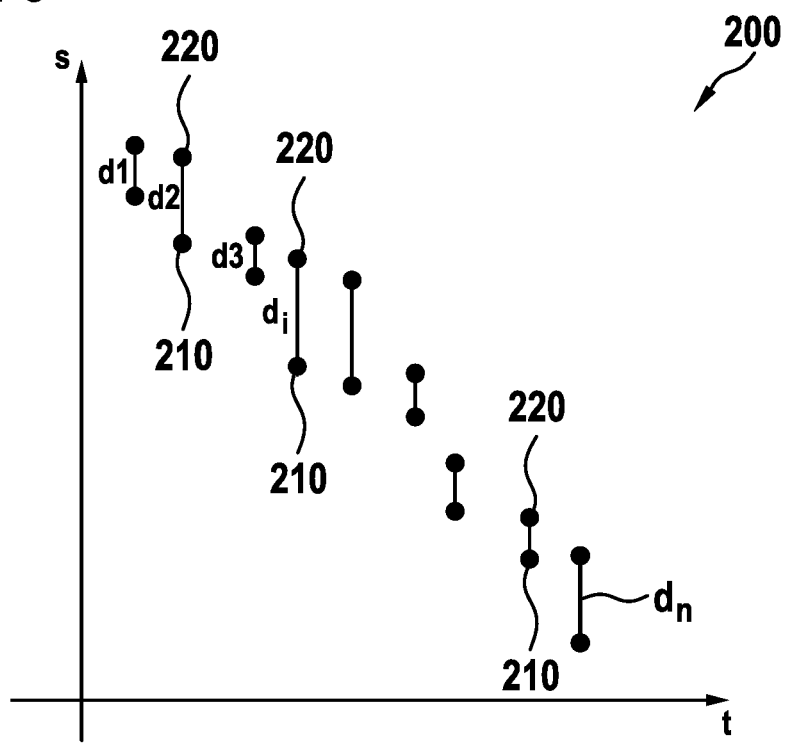
FIG. 3 shows distance data detected during multiple temporally successive measurements by way of example according to the present invention in consideration of multiple echoes, for each measurement a distance $d_i$ being determined in accordance with a distance between a temporally first received echo signal and a temporally last received echo signal of a measurement.

In FIG. 3, by way of example in a diagram 200 for a plurality of measurements i, temporally first received echo signal 210 and temporally last received echo signal 220 and distance $d_i$ determined therefrom are shown in each case. Measurement time t is plotted on the x axis and measured distance s to the ultrasonic sensor is plotted on the y axis.

It may be compared for each measurement whether distance d exceeds a predefined distance threshold value and a frequency with respect to the number of measurements carried out, in which distance d exceeds the predefined distance threshold value, may thus be determined.

As a further feature, the number of the received echo signals per measurement over the ultrasonic sensors is determined. In the situation shown in FIG. 1, the two middle ultrasonic sensors 12.2 and 12.3 will receive stronger echo signals due to their proximity and alignment with respect to pedestrian 80 than the two outer ultrasonic sensors 12.1 and 12.4. It is accordingly more probable that middle ultrasonic sensors 12.2 and 12.3 will receive multiple echoes. The distribution of the number of the received echo signals per measurement will thus have an accumulation in ultrasonic sensors 12.2 and 12.3 arranged adjacent to one another.

Figure 2:
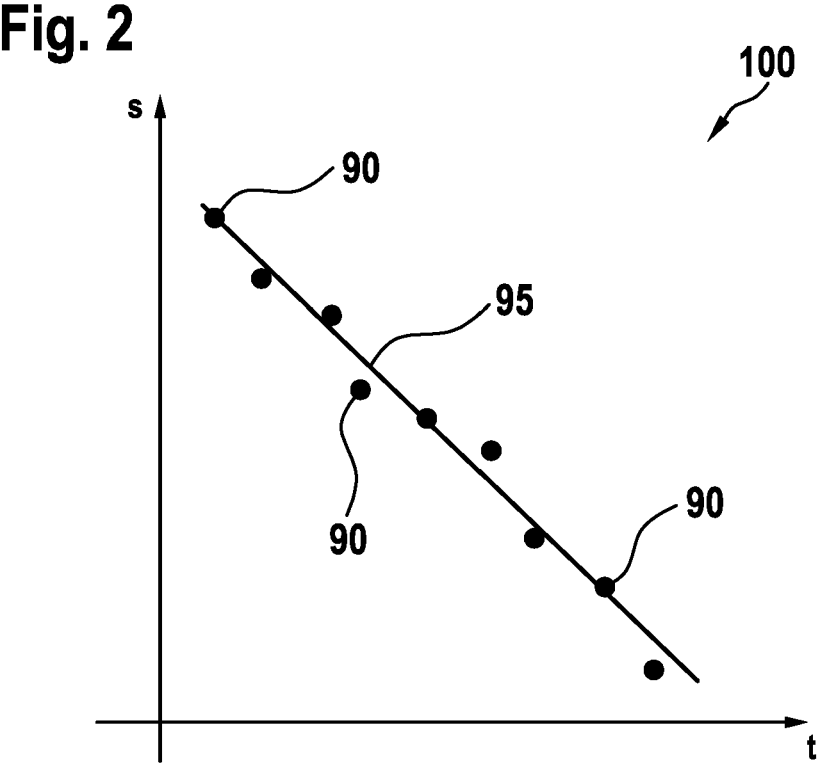
FIG. 2 shows distance data detected during multiple temporally successive measurements by way of example according to an example embodiment of the present invention.

Also because of the complex structure of a pedestrian 80, in a sequence of measurements, a distance determined from a particular temporally first received echo signal between pedestrian 80 and the ultrasonic sensor may also vary, in particular in comparison to a geometrically simple, stable reflector such as a curbstone. This is shown by way of example in FIG. 2 in a measurement diagram 100. Measurement time t is plotted on the x axis and measured distance s to the ultrasonic sensor is plotted on the y axis. A distance 90 between reflecting object 70 and the measuring ultrasonic sensor is determined at each measurement time with the aid of the temporally first received echo signal. Overall, a relative, linear approach between the measuring ultrasonic sensor and reflecting object 70 is visible, as shown by straight line 95. With known vehicle velocity and the assumption of a stationary object, straight line 95 may be calculated. If the movement state of object 70 is not known, straight line 95 may be determined from measured values 90 (for example by typical fit methods). To determine the fifth feature, a variance of measured values 90 representing the particular object distance is determined over multiple measurements with respect to straight line 95, by which an approach of object 70 to vehicle 1 or the measuring ultrasonic sensor is taken into consideration. If the variance thus determined according to the fifth feature exceeds a second variance threshold, this may be assessed as a further indication that reflecting object 70 is a pedestrian 80.

Figure 4:
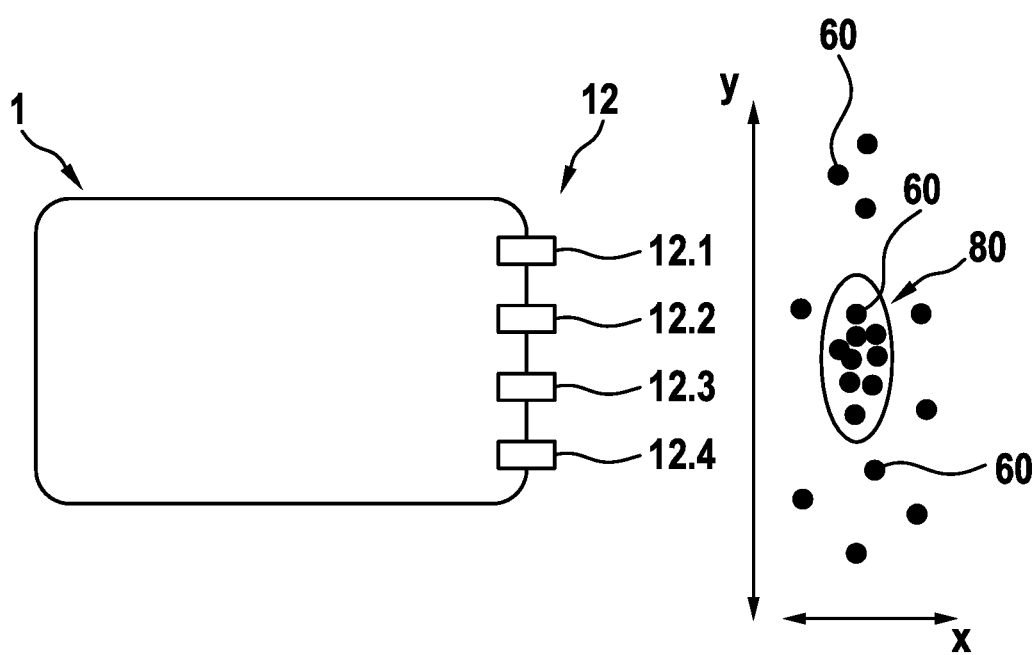
FIG. 4 schematically shows a motor vehicle designed according to the present invention and a pedestrian, and superimposed, a distribution of reflection points from a plurality of measurements.

FIG. 4 schematically shows in a possible example how the eighth feature according to the present invention may be determined, which represents a distribution of reflection points 60. FIG. 4 schematically shows the front of a vehicle 1, which includes an ultrasonic sensor system 12 including four ultrasonic sensors 12.1, 12.2, 12.3, and 12.4. An object 70 is located ahead of vehicle 1. By way of a plurality of measurements with the aid of ultrasonic sensors, coordinates of reflection points 60 are determined, for example, with the aid of trilateration, each of which indicates a measured position of object 70. A spatial distribution of the reflection points is formed, as indicated by the coordinate system in FIG. 4. It has been shown that in the case of a pedestrian 80, a characteristic distribution of reflection points 60 results, which includes, on the one hand, an accumulation at a probable object position, and a certain scattering of reflection points 60 in the lateral direction, thus in a direction perpendicular to the main measurement direction.

What is claimed is:

1. A method for classifying an object in surroundings of a motor vehicle, using an ultrasonic sensor system, the ultrasonic sensor system including a plurality of spatially distributed ultrasonic sensors, the method comprising the following steps:
   carrying out a plurality of measurements, during each of the plurality of measurements, an ultrasonic signal being emitted by one of the ultrasonic sensors of the plurality of ultrasonic sensors, a signal being received by at least one of the ultrasonic sensors, the signal including a plurality of reflected echo signals, the received echo signal being associated with an object;
   classifying the object as a pedestrian as a function of a combination of at least a first feature, a third feature, and an eighth feature of the following eight features:
   the first feature, which represents a frequency with respect to a number of the plurality of measurements carried out with which a respective distance exceeds a predefined distance threshold value, each of the respective distance corresponding to a distance between a temporally first received echo signal of a measurement of the plurality of measurements and a temporally last received echo signal of the measurement;
   a second feature, which represents a variance of the distances;
   the third feature which represents a distribution of a number of the received echo signals per measurement via the ultrasonic sensors;
   a fourth feature which represents an alignment of the ultrasonic sensors with respect to the object;
   a fifth feature, which represents a variance of first object distances over multiple measurements, an associated first object distance being calculated for each determined temporally first received echo signal in an approach of the object being taken into consideration in the determination of the variance;

a sixth feature, which represents a correlation of the received echo signal with a sent ultrasonic signal;

a seventh feature, which represents an amplitude of an echo signal;

the eighth feature, which represents a distribution of reflection points, each reflection point indicating a measured object position, wherein the object is classified as a pedestrian when at least the frequency according to the first feature exceeds a frequency threshold value and the distribution according to the third feature has a result that only one of the plurality of ultrasonic sensors or only a few of the plurality of ultrasonic sensors which are adjacent to one another, have received a plurality of echo signals per measurement, wherein the object is classified as a pedestrian when, in addition, a spatial distribution of the reflection points according to the eighth feature has a characteristic shape, the characteristic shape including an accumulation of reflection points at a probable object position and a scattering in a lateral direction.

2. The method as recited in claim 1, wherein the object is classified as a pedestrian when, in addition, the variance according to the second feature exceeds a first variance threshold value.

3. The method as recited in claim 1, wherein according to the fourth feature, only those ultrasonic sensors are taken into consideration in the determination of the distance which are aligned on the object.

4. The method as recited in claim 1, wherein according to the fourth feature, only that ultrasonic sensor being taken into consideration which has a main measuring direction which is aligned best on the object.

5. The method as recited in claim 1, wherein the object is classified as a pedestrian when, in addition, the variance according to the fifth feature exceeds a second variance threshold value.

6. The method as recited in claim 1, wherein the emitted ultrasonic signal has a certain frequency profile and a frequency profile is determined for at least one received echo signal and according to the sixth feature, a correlation value of the echo signal with the sent ultrasonic signal is calculated.

7. The method as recited in claim 6, wherein a classification of the object as a pedestrian is excluded when the correlation value is greater than a certain correlation threshold value for a certain number of measurements.

8. The method as recited in claim 1, wherein according to the seventh feature, an amplitude is determined for at least one received echo signal, and a classification of the object as a pedestrian is excluded when the amplitude of the at least one received echo signal is greater than a certain amplitude threshold value.

9. The method as recited in claim 1, wherein an optimized combination of features and/or the threshold value for classifying the object as a pedestrian, is determined beforehand using a machine learning method.

10. A device configured to classify an object in surroundings of a motor vehicle, the device comprising:
an ultrasonic sensor system, the ultrasonic sensor system including a plurality of spatially distributed ultrasonic sensors situated at a body of a motor vehicle; and
an evaluation unit configured to:
carry out a plurality of measurements, during each of the measurements, an ultrasonic signal being emitted by one of the ultrasonic sensors, a signal being received by at least one of the ultrasonic sensors, which includes a plurality of reflected echo signals, the received echo signals being associated with an object;
classify the object as a pedestrian as a function of a combination of at least a first feature, a third feature, and an eighth feature of the following eight features:
the first feature, which represents a frequency with respect to a number of the measurements carried out with which a respective distance exceeds a predefined distance threshold value, each of the respective distance corresponding to a distance between a temporally first received echo signal of a measurement of the measurements and a temporally last received echo signal of the measurement;
a second feature, which represents a variance of the distance;
the third feature which represents a distribution of a number of the received echo signals per measurement via the ultrasonic sensors;
a fourth feature which represents an alignment of the ultrasonic sensors with respect to the object;
a fifth feature, which represents a variance of first object distances over multiple measurements, an associated first object distance being calculated for each determined temporally first received echo signal in an approach of the object being taken into consideration in the determination of the variance;
a sixth feature, which represents a correlation of the received echo signal with the sent ultrasonic signal;
a seventh feature, which represents an amplitude of an echo signal;
the eighth feature, which represents a distribution of reflection points, each reflection point indicating a measured object position,
wherein the object is classified as a pedestrian when at least the frequency according to the first feature exceeds a frequency threshold value and the distribution according to the third feature has a result that only one of the plurality of ultrasonic sensors or only a few of the plurality of ultrasonic sensors which are adjacent to one another, have received a plurality of echo signals per measurement,
wherein the object is classified as a pedestrian when, in addition, a spatial distribution of the reflection points according to the eighth feature has a characteristic shape, the characteristic shape including an accumulation of reflection points at a probable object position and a scattering in a lateral direction.

11. A motor vehicle, comprising:
a device, including:
an ultrasonic sensor system, the ultrasonic sensor system including a plurality of spatially distributed ultrasonic sensors situated at a body of a motor vehicle; and
an evaluation unit configured to:
carry out a plurality of measurements, during each of the measurements, an ultrasonic signal being emitted by one of the ultrasonic sensors, a signal being received by at least one of the ultrasonic sensors, which includes a plurality of reflected echo signals, the received echo signals being associated with an object;

classify the object as a pedestrian as a function of a combination of at least a first feature, a third feature, and an eighth feature of the following eight features:

the first feature, which represents a frequency with respect to a number of the measurements carried out with which a respective distance exceeds a predefined distance threshold value, each of the respective distance corresponding to a distance between a temporally first received echo signal of a measurement of the measurements and a temporally last received echo signal of the measurement;

a second feature, which represents a variance of the distance;

the third feature which represents a distribution of a number of the received echo signals per measurement via the ultrasonic sensors;

a fourth feature which represents an alignment of the ultrasonic sensors with respect to the object;

a fifth feature, which represents a variance of first object distances over multiple measurements, an associated first object distance being calculated for each determined temporally first received echo signal in an approach of the object being taken into consideration in the determination of the variance;

a sixth feature, which represents a correlation of the received echo signal with the sent ultrasonic signal;

a seventh feature, which represents an amplitude of an echo signal;

the eighth feature, which represents a distribution of reflection points, each reflection point indicating a measured object position, wherein the object is classified as a pedestrian when at least the frequency according to the first feature exceeds a frequency threshold value and the distribution according to the third feature has a result that only one of the plurality of ultrasonic sensors or only a few of the plurality of ultrasonic sensors which are adjacent to one another, have received a plurality of echo signals per measurement, wherein the object is classified as a pedestrian when, in addition, a spatial distribution of the reflection points according to the eighth feature has a characteristic shape, the characteristic shape including an accumulation of reflection points at a probable object position and a scattering in a lateral direction.

* * * * *